(No Model.)

T. C. ROCHE.
PHOTOGRAPHIC COLOR SCREEN.

No. 561,132. Patented June 2, 1896.

WITNESSES:
Edward C. Rowland
William J. Farrell

INVENTOR
Thomas C. Roche
BY Phillips Abbott
ATTORNEY

UNITED STATES PATENT OFFICE.

THOMAS C. ROCHE, OF BROOKLYN, NEW YORK, ASSIGNOR TO THE E. & H. T. ANTHONY & COMPANY, OF NEW YORK, N. Y.

PHOTOGRAPHIC COLOR-SCREEN.

SPECIFICATION forming part of Letters Patent No. 561,132, dated June 2, 1896.

Application filed June 6, 1895. Serial No. 551,812. (No model.)

*To all whom it may concern:*

Be it known that I, THOMAS C. ROCHE, a citizen of the United States, and a resident of Brooklyn, in the county of Kings and State of New York, have invented certain new and useful Improvements in Photographic Color-Screens, of which the following is a specification.

My invention relates to improvements in photographic apparatus used in the production of colored photographs. In making such photographs it is desirable to interpose between the lens of the camera and the sensitive surface a "color-filter," so called—in other words a plate of glass or equivalent material colored in such manner as to intercept certain rays of the spectrum, thereby affecting the resulting picture. The colors most frequently used are blue, yellow, and red, although others may be employed. It has been customary heretofore to introduce the said colored plates one at a time at some suitable part of the apparatus between the lens and the sensitive surface, and it has been found in practice inconvenient to have the said plates each of a different color separate from each other, because they are liable to become misplaced and lost; also, being detached from the camera apparatus, they are very liable to become broken, and, moreover, their manipulation is attended with inconvenience and loss of time. By my invention I combine all of the color-filters that are to be used in a single frame, and this frame is so constructed that each of the colored glasses may in turn be thrown into registration with the lenses, and the frame being made an integral part of the apparatus cannot become misplaced or broken.

I embody my invention in various forms. Shown in the accompanying drawings is one form only, in which the filter-frame is represented as being circular in form and rotating upon a central axis, and the frame is adapted to move through a light-tight slot made in the sides of the lens-tube or other suitable part of the apparatus.

Figure 1:
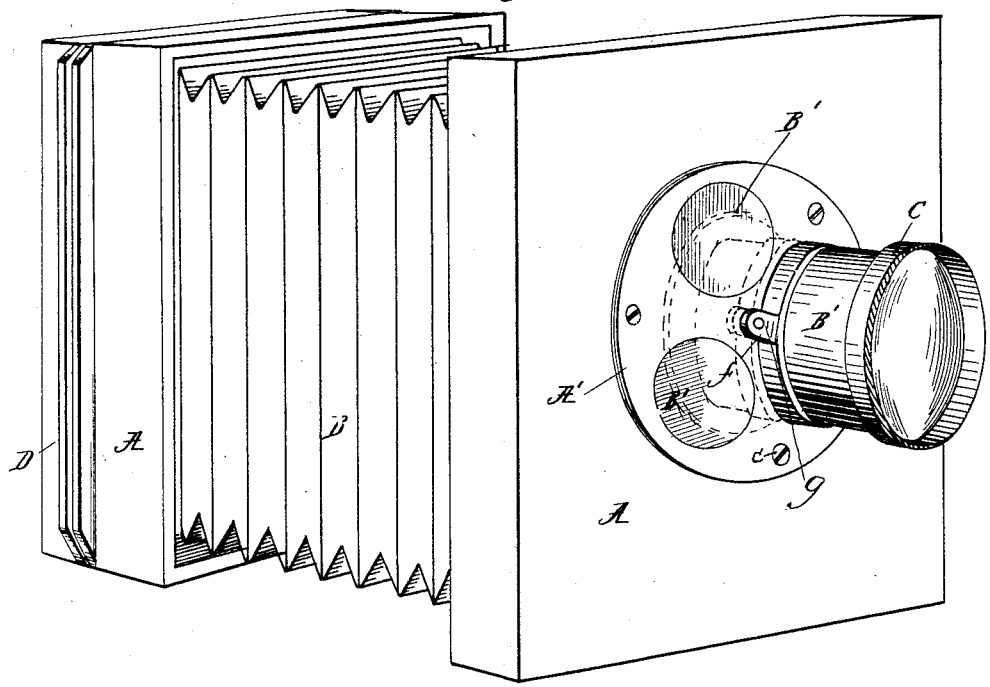
Figure 2:
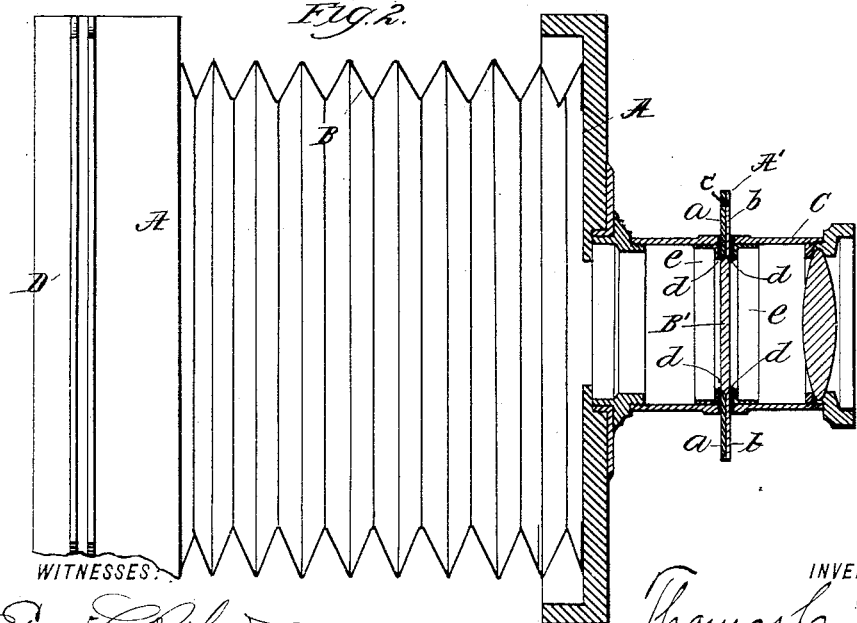

Figure 1 illustrates a perspective view of a camera-box, showing all the parts in position. Fig. 2 illustrates a sectional view thereof, a part being in elevation.

A is the frame of the box of an ordinary photographic camera; B, the bellows thereof; C, the usual lens-tube; D, the plate-holders containing the ordinary sensitized surface, irrespective of its special character.

Referring now to the parts more particularly embraced in the invention, A' is a frame of any suitable material, preferably hard rubber or metal.

B' B' B' are three color-filters—*i. e.*, plates of colored glass, preferably of such size as to cover the field of the lens—and they are confined within the frame A' in such manner that the surfaces of the filters are flush with the surfaces of the frame, so that as it rotates through the slots in the lens-tube in contact with the light-tight cushioning devices, hereinafter to be explained, there may be no passage of the light into the camera by the sides of these filter-plates as they pass through the slot, because being of the same thickness as the frame they will fill all the space, thus excluding the light. A convenient way in which to confine the filters within the frame is shown in the cross-section in Fig. 2, where the frame A' is shown as made of two parts *a b*, which are fastened together by rivets or equivalent devices *c*. The holes in the two parts *a* and *b* of the frame in which the filter-plates are placed are inwardly beveled, as shown, and the peripheries or edges of the plates are outwardly beveled to conform thereto. Consequently when the plates are in position and the two parts of the frame brought up close side by side and fastened together by rivets or equivalent devices the plates are firmly held in place and the whole structure becomes integral. To more effectually exclude the light, I provide felt, plush, or equivalent cushioning devices *d* all about the edges of the slot in the lens-tube, through which the frame A slides, and in order to more effectually support this cushion I supply flanges *e* on the inside of the lens-tube, to which the cushions are attached in any suitable manner.

*f* is a leg attached to the side of the lens-tube in any suitable manner, two being preferably provided, one on each side of the frame A', which legs support a pivot or axis G', which passes through the center of the frame A', and upon which that frame rotates as an axis.

It is obvious that any number of color-filters may be used. The three colors red, yellow, and blue are those most commonly employed; but the frame may be adapted to contain a greater or less number.

The operation of the invention is as follows: An exposure is made with one of the color-filters in registration with the lens. Thereupon the light is excluded in any suitable manner, and then the frame A', supporting the color-filters, is revolved to such an extent that the next plate of a different color comes into registration with the lens. Then the second exposure is made. The light is then again excluded, and then the last plate of still a different color is brought into registration with the lens, and then the last exposure is made. It will be obvious that as long or as short an exposure as desired may be given to each color. Thus perfection in the resulting picture is attained.

Having described my invention, I claim—

1. The combination in a photographic camera of a lens-tube, a lens in the tube, a movable frame containing differently-colored plates, the surface of which is flush with the surface of said frame, the lens-tube being provided with a slot through which the said frame moves and light-excluding cushions at the edges of said slot, for the purposes set forth.

2. The combination in a photographic camera of a lens-tube, a lens in the tube, a centrally-pivoted movable frame made in two parts, which hold between them differently-colored plates, the lens-tube being provided with a slot through which the frame moves and light-excluding devices at the edges of said slot, for the purposes set forth.

3. The combination in a photographic camera, of a lens-tube, a lens in the tube, a movable frame containing differently-colored plates, the surfaces of which are flush with the surfaces of said frame, the lens-tube being provided with a slot through which the said frame moves, for the purposes set forth.

Signed at New York, in the county of New York and State of New York, this 3d day of June, A. D. 1895.

THOMAS C. ROCHE.

Witnesses:
PHILLIPS ABBOTT,
WILLIAM J. FARRELL.